United States Patent
Geng et al.

(10) Patent No.: US 11,010,259 B1
(45) Date of Patent: May 18, 2021

(54) CONTAINER-BASED UPGRADES FOR APPLIANCES

(71) Applicant: Veritas Technologies LLC, Santa Clara, CA (US)

(72) Inventors: Chao Geng, Beijing (CN); Xi Wang, Beijing (CN)

(73) Assignee: Veritas Technologies LLC, Santa Clara, CA (US)

(*) Notice: Subject to any disclaimer, the term of this patent is extended or adjusted under 35 U.S.C. 154(b) by 30 days.

(21) Appl. No.: 15/907,489

(22) Filed: Feb. 28, 2018

(51) Int. Cl.
| | | |
|---|---|---|
| *G06F 9/44* | (2018.01) | |
| *G06F 11/14* | (2006.01) | |
| *G06F 8/65* | (2018.01) | |
| *G06F 8/658* | (2018.01) | |
| *G06F 9/445* | (2018.01) | |

(52) U.S. Cl.
CPC .......... *G06F 11/1458* (2013.01); *G06F 8/65* (2013.01); *G06F 8/658* (2018.02); *G06F 9/4451* (2013.01); *G06F 11/1402* (2013.01); *G06F 11/1451* (2013.01); *G06F 11/1469* (2013.01); *G06F 11/1471* (2013.01); *G06F 2201/80* (2013.01); *G06F 2201/805* (2013.01); *G06F 2201/82* (2013.01); *G06F 2201/84* (2013.01)

(58) Field of Classification Search
CPC .............. G06F 16/1815; G06F 9/5088; G06F 9/45558; G06F 9/4403; G06F 21/575; G06F 3/0604; G06F 11/3664; G06F 11/1443; G06F 9/461; G06F 16/22; G06F 11/1402; G06F 11/1471; G06F 11/1458; G06F 11/1469; G06F 2201/24; H04L 41/12; H04L 29/06
See application file for complete search history.

(56) References Cited

U.S. PATENT DOCUMENTS

| | | | | |
|---|---|---|---|---|
| 6,453,343 | B1* | 9/2002 | Housel | H04L 29/06 709/213 |
| 8,832,455 | B1* | 9/2014 | Drewry | G06F 21/575 713/187 |
| 2006/0080522 | A1* | 4/2006 | Button | G06F 9/4403 713/2 |
| 2009/0217021 | A1* | 8/2009 | Goodson | G06F 9/45558 713/1 |
| 2009/0276590 | A1* | 11/2009 | Nagaraj | G06F 11/1443 711/162 |
| 2015/0006487 | A1* | 1/2015 | Yang | G06F 9/461 707/649 |
| 2015/0193464 | A1* | 7/2015 | Kwon | G06F 16/1815 707/648 |
| 2016/0378525 | A1* | 12/2016 | Bjorkengren | G06F 9/45558 718/1 |
| 2017/0199770 | A1* | 7/2017 | Peteva | G06F 9/5088 |
| 2017/0373940 | A1* | 12/2017 | Shahab | H04L 41/12 |

(Continued)

*Primary Examiner* — Tuan A Vu
(74) *Attorney, Agent, or Firm* — Campbell Stephenson LLP

(57) ABSTRACT

Disclosed herein are methods, systems, and processes to perform container-based upgrades to an appliance operating system. An upgraded container is generated by producing a container image. Producing the container image includes generating a checkpoint of a portion of a file system associated with an appliance that includes a portion of an operating system. The container includes the container image and is designated for an upgrade operation that upgrades the portion of the operating system.

20 Claims, 12 Drawing Sheets

(56) References Cited

U.S. PATENT DOCUMENTS

2018/0032410 A1* 2/2018 Kang ................... G06F 9/45558
2018/0074748 A1* 3/2018 Makin .................. G06F 3/0604
2018/0196732 A1* 7/2018 Dolev ................. G06F 11/3664
2018/0336229 A1* 11/2018 Muehle ................. G06F 16/22

* cited by examiner

CONTAINER-BASED UPGRADES FOR APPLIANCES

FIELD OF THE DISCLOSURE

This disclosure is related to containerization technology. In particular, this disclosure is related to container-based sandbox upgrades for appliances.

DESCRIPTION OF THE RELATED ART

Businesses use appliances to provide business services to customers. Appliances can be hardware devices with integrated software (e.g., firmware), designed to provide one or more business services. Appliances can also be virtual appliances. Virtual appliances are preconfigured virtual machine images and can be created by installing software appliances on virtual machines. Unlike general purpose computers, appliances are not designed to allow users to change the software (including the underlying operating system (OS)).

Appliances can also be configured with hardware and/or software to enable them to function as clients and/or servers. An end user of these clients and/or servers need not understand the technical details of the underlying OS running on the appliances because the hardware and/or software is preconfigured (e.g., by a manufacturer) and unmodifiable. In this manner, appliances are designed to be secure black boxes for the end user (e.g., a customer).

A sandbox is a security mechanism for separating running programs, usually in an effort to mitigate system failures or software vulnerabilities from spreading. Sandbox containers are typically used to execute untested or untrusted programs or code, possibly from unverified or untrusted third parties, suppliers, users or websites, without risking harm to the host appliance or OS. A sandbox typically provides a tightly controlled set of resources for guest programs to run in (e.g., scratch space on disk and memory). Network access, the ability to inspect the host system, or read from input devices are usually disallowed or heavily restricted.

Containerization refers to an OS feature in which the kernel allows the existence of multiple isolated user-space instances. Such instances, called containers, may look like real computers from the point of view of programs running in them. A computer program running on an appliance OS can see the resources (e.g., connected devices, files and folders, network shares, processing power, quantifiable hardware capabilities, and the like) of that appliance. However, programs running inside a container can only see the container's contents and devices assigned to the container.

Therefore, given the closed nature of appliances, the use of container-based sandboxing can be useful to perform discrete and secure upgrade operations in an appliance without disrupting the appliance's operation or weakening its security features. In consideration of the operational complexities and modification limitations of appliances, container-based sandboxing can be implemented in appliance computing environments to upgrade an appliance's OS and other components.

SUMMARY OF THE DISCLOSURE

Disclosed herein are methods, systems, and processes to perform container-based upgrades to an appliance operating system. One such method involves generating an upgrade container by producing a container image. In this example, producing the container image includes generating a checkpoint of a portion of a file system associated with an appliance that includes a portion of an operating system. The container includes the container image and is designated for an upgrade operation that upgrades the portion of the operating system.

In one embodiment, the portion of the operating system includes a root file system and a boot directory. In this example, the root file system and the boot directory are merged into the container and host directories not captured by the checkpoint are mounted into the container. The upgrade operation that upgrades the portion of the operating system includes an incremental upgrade operation or a migration upgrade operation.

In some embodiments, the method involves determining that the upgrade operation includes the incremental upgrade operation. In this example, performing the incremental upgrade operation includes deleting the container if the incremental upgrade operation is unsuccessful, and saving a container file system executing in the container to a new checkpoint if the incremental upgrade is successful. The appliance is restored based on the new checkpoint.

In other embodiments, the method involves determining that the upgrade operation comprises the migration upgrade operation, accessing an upgrade container image from an upgrade package as the container image, creating an upgrade container based on the upgrade container image, backing up user configuration information associated with the appliance, and re-configuring the user configuration information in the upgrade container. In this example, the upgrade container and the upgrade container image are deleted if the migration upgrade operation is unsuccessful. If the migration upgrade operation is successful, a container file system stored in the upgrade container is saved to a new checkpoint, and the appliance is restored based on the new checkpoint.

In certain embodiments, the container is a sandbox upgrade container, the container file system is based on the container image, the container file system is a copy of the file system associated with the appliance, the checkpoint is configured to be loaded by a container daemon as a container root file system, and performing the migration upgrade operation includes replacing the operating system associated with the appliance.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
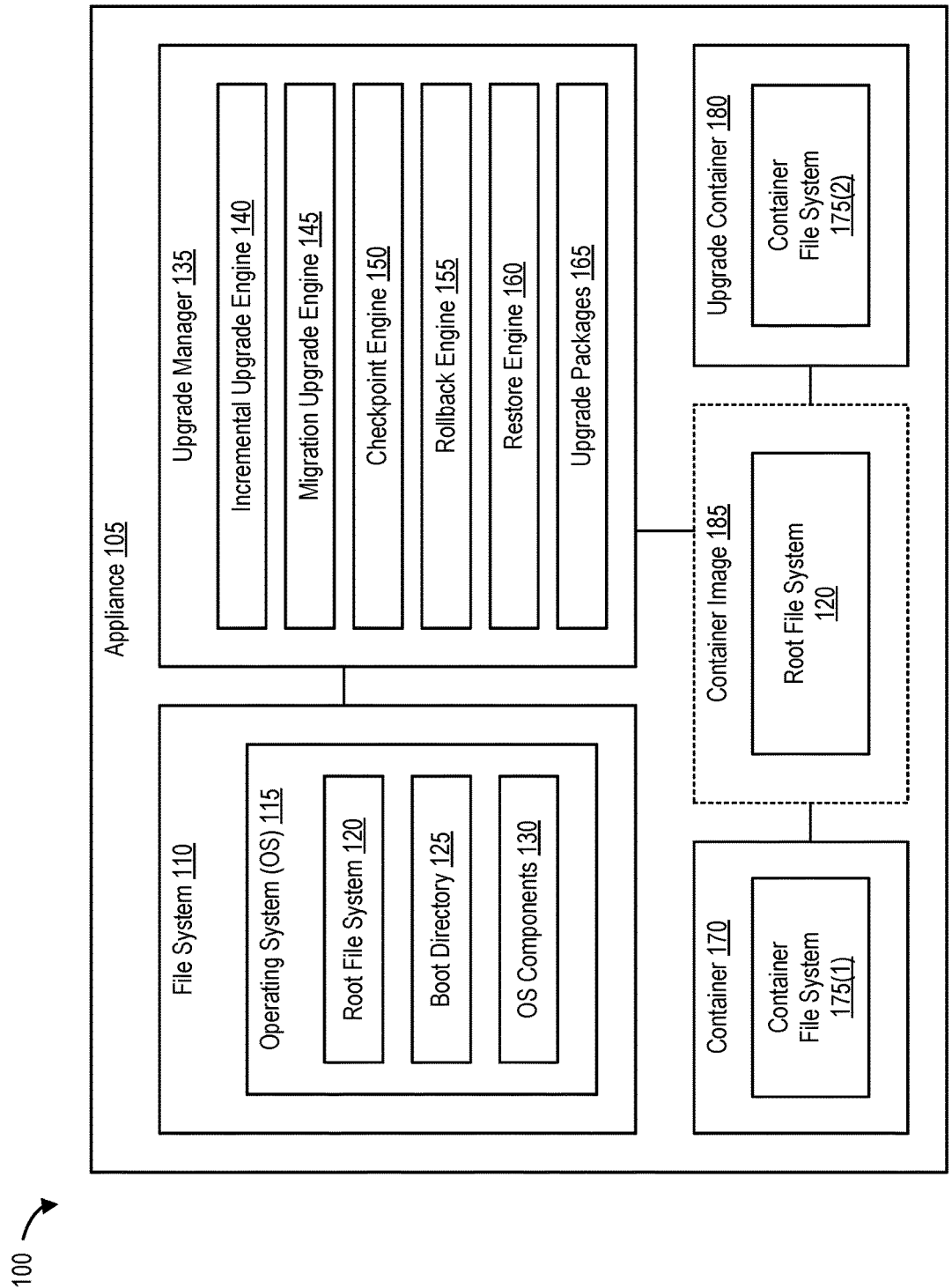
FIG. 1 is a block diagram 100 of an appliance that implements container-based sandboxing, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Appliances are discrete hardware devices with integrated software (e.g., firmware), specifically designed to provide a specific computing resource (e.g., access to one or more business services). Appliances can also be virtual appliances. Virtual appliances are configured to provide similar functionality as dedicated hardware appliances, but virtual appliances are distributed (e.g., to customers), as software virtual machine images in a hypervisor, or for a hypervisor-enabled device. In addition, customers can deploy appliances by integrating the software (e.g., operating system (OS) software) and the hardware of a computing device.

Appliance have exactly one combination of hardware, operating system, and application software (e.g., application software that is required to provide business services). Therefore, appliances can be deployed and managed by customers without extensive information technology (IT) knowledge. Once deployed however, appliances typically do not permit (and are not designed to allow) customers to change (or modify) the software (e.g., OS software). Therefore, appliances are designed to be secure black boxes for customers.

A sandbox is a security mechanism for separating running programs, usually in an effort to mitigate system failures or software vulnerabilities from spreading. Sandbox containers are typically used to execute untested or untrusted programs or code, possibly from unverified or untrusted third parties, suppliers, users or websites, without risking harm to the host appliance or OS. A sandbox typically provides a tightly controlled set of resources for guest programs to run in (e.g., scratch space on disk and memory). Network access, the ability to inspect the host system, or read from input devices are usually disallowed or heavily restricted.

Containerization refers to an OS feature in which the kernel allows the existence of multiple isolated user-space instances. Such instances, called containers, may look like real computers from the point of view of programs running in them. A computer program running on an appliance OS can see the resources (e.g., connected devices, files and folders, network shares, processing power, quantifiable hardware capabilities, and the like) of that appliance. However, programs running inside a container can only see the container's contents and devices assigned to the container.

Therefore, given the closed nature of appliances, the use of container-based sandboxing can be useful to perform discrete and secure upgrade operations in an appliance without disrupting the appliance's operation or weakening its security features. However, due to the operational complexities and modification limitations of appliances, implementing container-based sandboxing in appliance computing environments to upgrade an appliance's OS and other components presents a unique technology-related challenge.

Appliances are implemented to provide a secure virtual computing environment. For example, sandboxing typically relies on multiple virtual machines to intercept network traffic as data enters or leaves a network. Sandboxing provides a choke point for malicious activity detection and isolates unknown files to determine if the files are safe for use and/or installation. With a container, all files are considered dangerous. Because containerization only provides the isolation capability required by sandboxing (and not file granularity), containerization alone is inefficient to upgrade OSs in appliances because containerization does not permit the determination of whether a given file (e.g., in a file system) is suitable for OS installation. Because not every OS file in a given appliance file system is required for upgrade, it is efficient to isolate and test only certain files for OS upgrade suitability (e.g., files associated with a root file system, a boot directory, and the like).

Therefore, because appliances are typically implemented in secure virtual computing environments, it is desirable to implement container-based sandboxing for OS upgrade operations in appliances because directly upgrading a given appliance's OS can cause disruption and downtime in appliance operation, particularly if the upgrade operation is unsuccessful. Unfortunately, performing such OS upgrade operations using container-based sandboxing in secure virtual computing environments demanded by appliance ecosystems presents technology-related challenges for several reasons.

First, if a sanity check or a pre-upgrade check performed in an appliance cannot find any errors or issues (e.g., if the conditions for OS upgrade are not met or the upgrade cannot continue because of other software and/or hardware errors), the OS upgrade fails. Given the secure and closed nature of appliances, a testing computing environment cannot be setup externally. Second, if the OS upgrade fails for any reason and the appliance has to be rebooted, rollback operations typically fail resulting in costly appliance downtime at least because configuration information (which may not be necessary for a successful OS upgrade) updated during a partial upgrade cannot be cleared during rollback. Third, currently there exists no methodology to perform simple and efficient OS migration from an old version of an appliance OS to a new version of the same appliance OS.

Disclosed herein are methods, systems, and processes to perform OS upgrades in appliances using container-based sandboxing by avoiding the foregoing problems associated with sanity checks, rollback, and OS migration. In some embodiments, a single container computing environment is provided in an appliance for OS upgrade operations. In this example, a container image is created based on the appliance's running environment, and sanity checks, pre-upgrade operations, upgrade operations, and post-upgrade operations are performed in an instance of the container image. If OS upgrade is unsuccessful and rollback is necessary, the instance of the container image is simply deleted. However, if OS upgrade is successful, the appliance is restored based on an upgraded container image.

In other embodiments, the appliance implements a container-based sandbox that provides a single security virtual computing environment for OS upgrade. In this example, upgrade-related actions (e.g., sanity check, pre-upgrade, upgrade, and post-upgrade) are executed separately in the container sandbox. If a upgrade-related action fails, the container sandbox is stopped and deleted. However, if the upgrade-related actions are successful, the contents of the upgraded container are synchronized to the appliance host system. In this manner, and in addition to other advantages, the appliance host system's OS is upgraded in a secure virtual environment, without requiring requests for reboot in the case of rollback, and efficiently for migration-based OS upgrades.

Example Appliance with Container Sandbox for Upgrades

FIG. 1 is a block diagram 100 of an appliance that implements container-based sandboxing, according to one embodiment. An appliance, like appliance 105 can be any type of computing system or computing device (e.g., a desktop, a laptop, a mobile computing device, a server, and the like). Appliance 105 implements a file system 110. File system 110 includes at least an operating system 115 (OS 115). OS 115 includes at least a root file system 120, a boot directory 125, and OS components 130.

In one embodiment, boot directory 125 is the first or top-most directory in a file system hierarchy of file system 110. Root file system 120 is a file system contained on the same disk partition on which boot directory 125 is located and is thus the filesystem on top of which all other file systems are mounted as appliance 105 boots up. Therefore, upgrading OS 115 of appliance 105, requires, at the very minimum, upgrading root file system 120 and boot directory 125 (e.g., as opposed to host directories, which may or may not be upgraded).

Appliance 105 also includes an upgrade manager 135. Upgrade manager 130 implements at least an incremental upgrade engine 140 for performing incremental OS upgrade operations, a migration upgrade engine 145 for performing migration OS upgrade operations, a checkpoint engine 150 for generating checkpoints (e.g., of one or more portions of file system 110), a rollback engine 155 for rolling back a failed OS upgrade operation without requiring reboot of appliance 105, a restore engine 160 to synchronize the contents of an upgrade container to file system 110 of appliance 105, and upgrade packages 165 that provides both incremental upgrade packages and migration upgrade packages for incremental OS upgrade operations and migration OS upgrade operations, respectively.

Upgrade manager 135 generates, maintains, and manages one or more containers like container 170, one or more container images like container image 185, and one or more upgrade containers like upgrade container 180. Container 170 includes a container file system 175(1) and upgrade container 180 includes a container file system 175(2). Container image 185 includes at least root file system 120. A checkpoint is a feature of appliance 105. Typically, a checkpoint generates a snapshot of file system 110. However, a checkpoint cannot be used as a container image. Therefore, in one embodiment, upgrade manager 135 generates a single .tar file (e.g., an archive file) with an internal structure that matches (or mirrors) the requirements of container images. In this manner, upgrade manager 135 generates container image 185, where container image 185 matches an appliance's running environment. Upgrade manager 135 can also create a (new) checkpoint based on an upgraded container image (e.g., an upgraded container instance which can be used to restore appliance 105 to a new version of OS 115).

Example Checkpoint

Figure 2A:
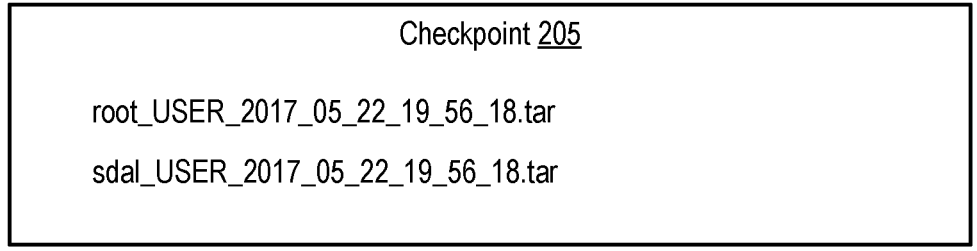
FIG. 2A is a block diagram 200A of a checkpoint, according to one embodiment of the present disclosure.

FIG. 2A is a block diagram 200A of a checkpoint, according to one embodiment. A checkpoint like checkpoint 205 is a function module associated with appliance 105. In one embodiment, checkpoint 205 is a differencing virtual disk that includes a special name, an extension, and a configuration file (e.g., with a Globally Unique Identifier (GUID)). In addition, checkpoint 205 may include additional files with appliance memory data and state of appliance devices (e.g., if an appliance was turned on within checkpoint creation). Once a checkpoint is taken, the differencing disk stores temporary changes to the appliance's original disk (e.g., while the original disk remains read-only). Therefore, checkpoint 205 provides a consistent state of one or more portions of file system 110 of appliance 105.

Although checkpoint 205 functions as a snapshot, traditional snapshots require a separate device for storage, are read-only, are transient, cease to exist after being unmounted, and track changed blocks on the file system level. On the contrary, checkpoint 205 resides on the same device as file system 110, can be read-only or read-write, is persistent, can exist mounted on its own, and tracks changed blocks on each file in file system 110. Therefore, checkpoint 205 is useful to identify, isolate, and segregate particular files of file system 110 and/or OS 115 for OS upgrade purposes (e.g., root file system 120 and boot directory 125). As shown in FIG. 2A, checkpoint includes root file system 120 (e.g., root_USER_2017_05_22_19_56_18.tar) and boot directory 125 (e.g., sda1_USER_2017_05_22_19_56_18.tar) as separate .tar files.

Figure 2B:
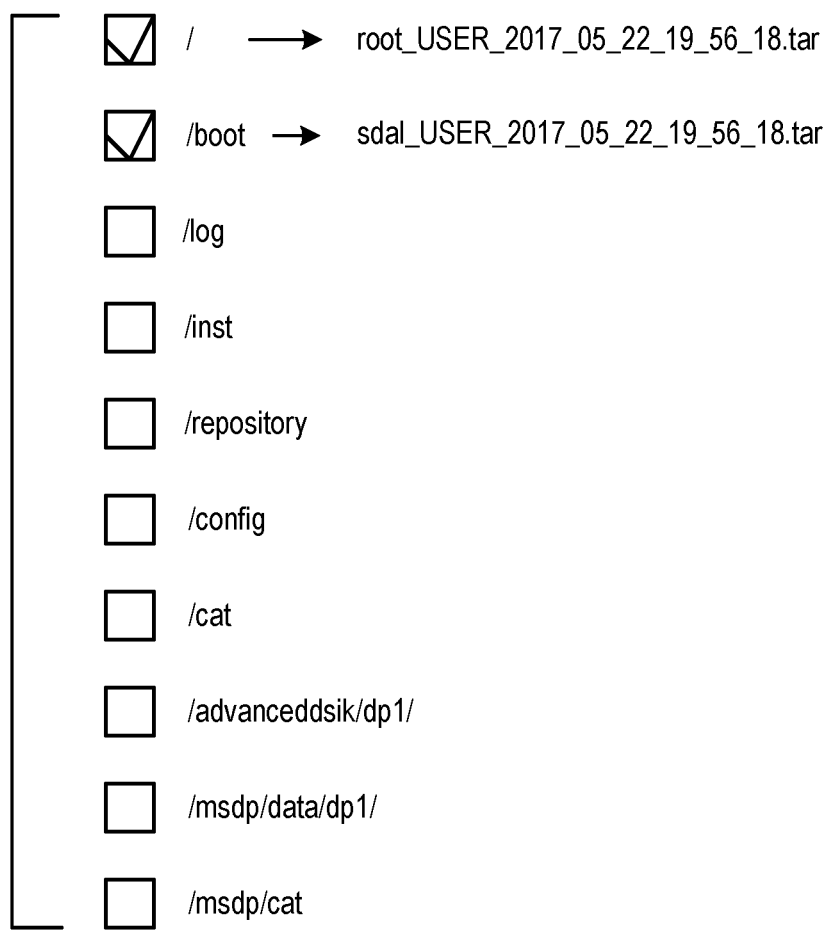
FIG. 2B is a block diagram 200B of contents of a checkpoint mounted on an appliance, according to one embodiment of the present disclosure.

FIG. 2B is a block diagram 200B of contents of a checkpoint mounted on an appliance, according to one embodiment. Checkpoint 205 generates a snapshot of one or more portions of file system 110 of appliance 105 (excluding log, inst, repository, and external storage and includes two .tar files (e.g., root file system 120 and boot directory 125). In one embodiment, checkpoint 205 only captures "I" and "/boot" in appliance mounted directory tree 210, as shown in FIG. 2B (e.g., root file system 120 (root_USER_2017_05_22_19_56_18.tar) and boot directory 125 (sda1_USER_2017_05_22_19_56_18.tar)).

Figure 2C:
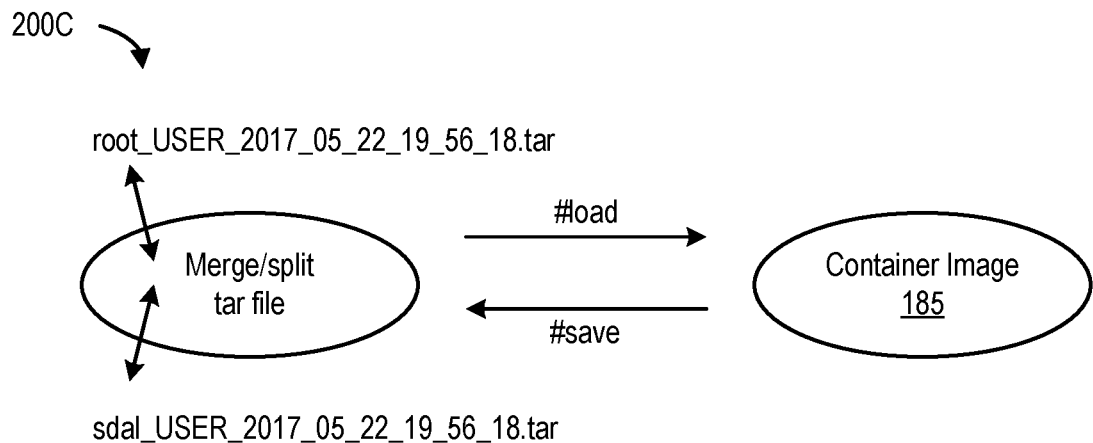
FIG. 2C is a block diagram of a merged/split tar file of a checkpoint, according to one embodiment of the present disclosure.

FIG. 2C is a block diagram of a merged/split tar file of a checkpoint, according to one embodiment. In this example, container image 185 can be loaded from an external .tar file (e.g., loading a container image from a tar archive) and can also be saved to an external .tar file (saving a single container image to a tar archive). In one embodiment, the two .tar files of checkpoint 205 (e.g., root file system 120 (root_USER_2017_05_22_19_56_18.tar) and boot directory 125 (sdal_USER_2017_05_22_19_56_18.tar) are merged and loaded as container image 185 and saved as container image 185 (e.g., to a .tar file). In this manner, a single .tar file of checkpoint 205 can be split into two separate .tar files.

Figure 2D:
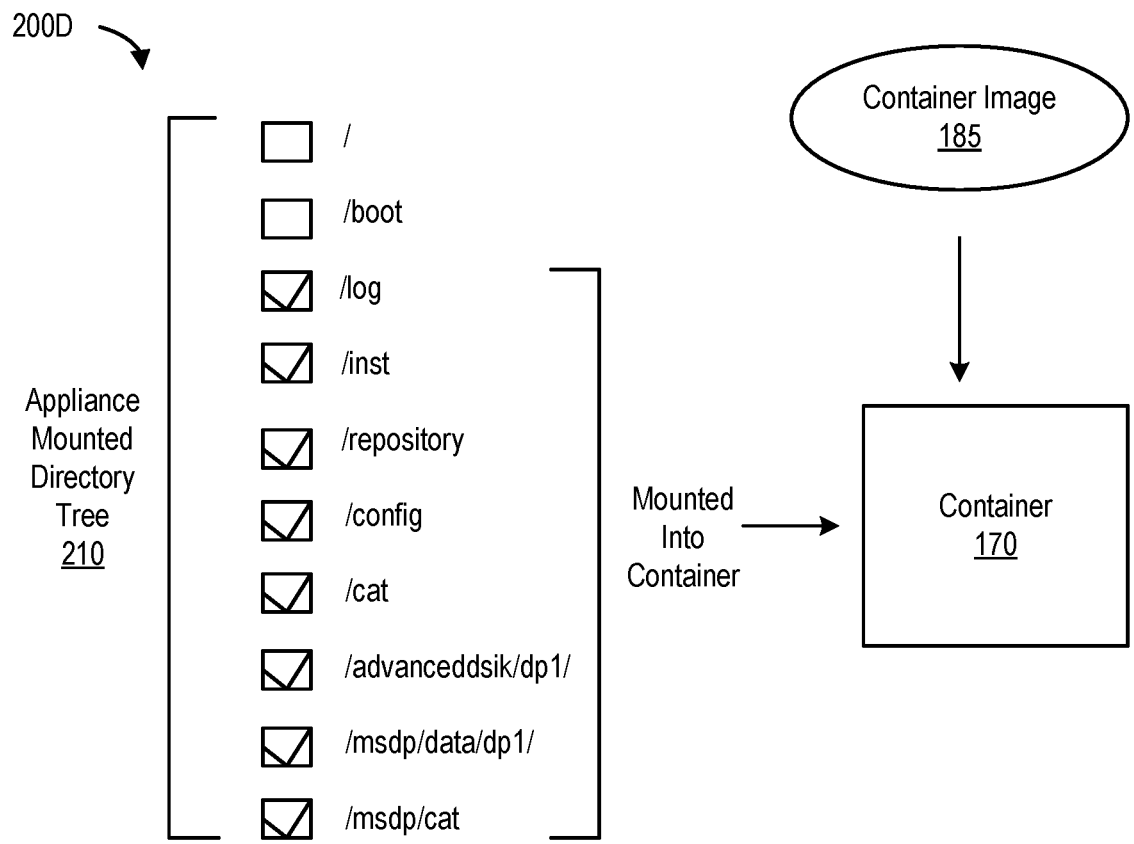
FIG. 2D is a block diagram 200C of host directories of an operating system mounted on an appliance, according to one embodiment of the present disclosure.

FIG. 2D is a block diagram 200C of host directories of an operating system mounted on an appliance, according to one embodiment. Container 170 is an instance of container image 185. In this example, container root file system (e.g., root file system 120 in container image 185) is based on container image 185. In one embodiment, host directories of appliance 105 (e.g., OS components 130) not covered or captured by checkpoint 205 are loaded into container 170. In this manner, the new setup container (e.g., container 170) is the same as appliance host system (e.g., one or more portions of file system 110 or OS 115).

In certain embodiments, an upgrade operation to upgrade OS 115 of appliance 105 includes an incremental upgrade operation or a migration upgrade operation. The incremental upgrade operation managed by incremental upgrade engine 140 does not make significant changes to appliance 105. In one embodiment, the incremental upgrade operation installs, removes, and upgrades packet manager packages provided by upgrade packages 165 and manages configuration file and data updates. However, in another embodiment, if appliance 105 is to be upgraded from an old version of OS 115 to a new version of OS 115, the migration upgrade operation managed by migration upgrade engine 145 backs up user configuration, perform full OS replacement, and restores user configuration.

In some embodiments, upgrade manager 135 generates upgrade container 180 by producing container image 185. In this example, producing container image 185 includes generating checkpoint 205 using checkpoint engine 150 of a portion of file system 110 associated with appliance 105 that includes a portion of OS 115. Container 170 includes container image 185 and is designated for an upgrade operation that upgrades the portion of OS 115 (e.g., from upgrade container 180).

In other embodiments, the portion of OS 115 includes root file system 120 and boot directory 125. Upgrade manager 135 merges root file system 120 and boot directory 125 into container 170 (as shown in FIG. 2C), and host directories not captured by checkpoint 205 are mounted into container 170 (as shown in FIG. 2D). At this point, container 170 can be upgraded by upgrade manager 135 to create upgrade container 180 (from which incremental upgrade operations and migration upgrade operations can be performed).

Example Upgrade Container Setup for Incremental Upgrades

Figure 3A:
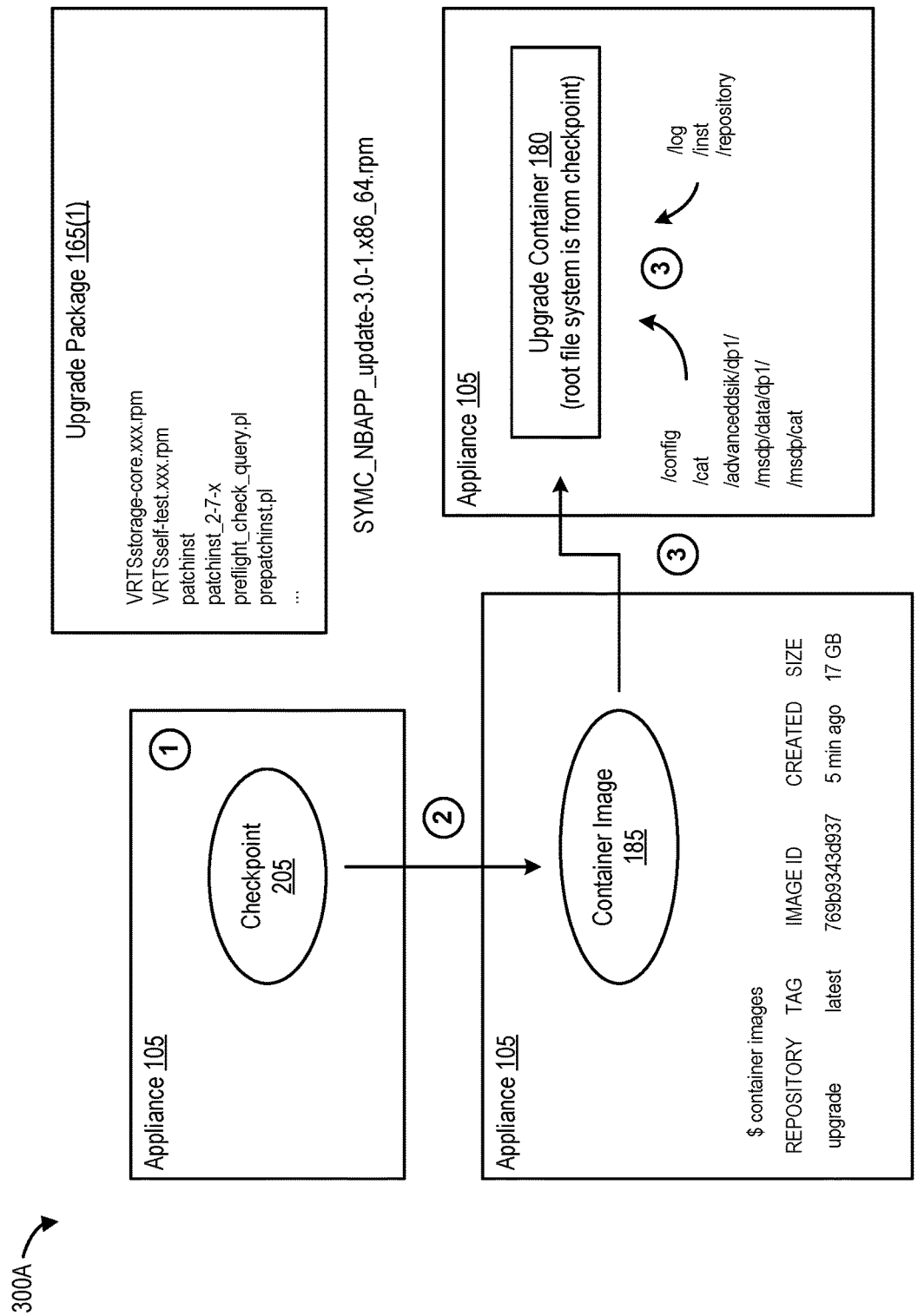
FIG. 3A is a block diagram 300A of upgrade container setup for an incremental upgrade operation, according to one embodiment of the present disclosure.

FIG. 3A is a block diagram 300A of upgrade container setup for an incremental upgrade operation, according to one embodiment. Performing an incremental upgrade operation in appliance 105 involves using upgrade package 165(1) provided by upgrade packages 165 as shown in FIG. 3A. Checkpoint engine 150 then creates checkpoint 205 on appliance 205, sets up container 170 based on checkpoint 205, and executes an upgrade program in container 170 (e.g., an OS upgrade program). If the upgrade operation fails, container 170 is deleted. However, if the upgrade operation is successful, checkpoint engine 150 saves container filesystem 175(1) to a new checkpoint .tar file (e.g., as container filesystem 175(2)) in upgrade container 180. OS 115 of appliance 105 is restored based on the new checkpoint.

As shown in FIG. 3A, and in some embodiments, setting up an upgrade container involves at least three steps. In step 1, checkpoint engine 150 generates or creates a checkpoint (e.g., checkpoint 205) that can be loaded by a container daemon as the container's root file system (e.g., root file system 120 in container image 185). In step 2, a container image upgrade is by loading a checkpoint .tar file (e.g., #load -I<path to CheckPoint tar file>). In step 3, upgrade container 180 is created by running an instance of the upgraded container image, mounting host directories into container 170 (as shown in FIG. 2D), and starting the (OS) upgrade program (e.g., run -d -v X:Y . . . upgradelatest/repository/ . . . /prepatchinst.pl) in container 170. In this manner, upgrade manager 135 generates upgrade container 180 that is the same as appliance 105 on a directory level and a file level.

Example of Performing Incremental Upgrade Operations

Figure 3B:
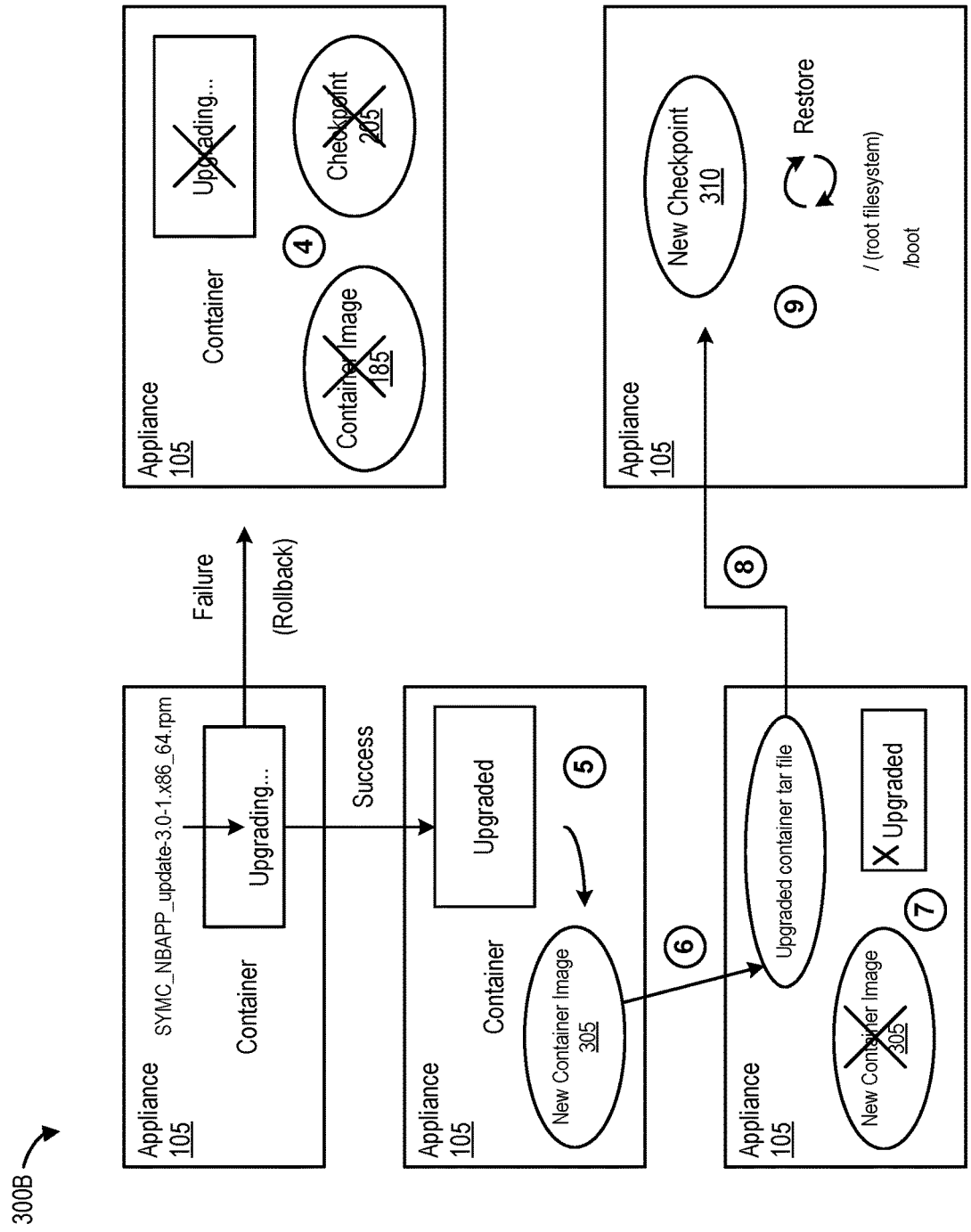
FIG. 3B is a block diagram 300B of an incremental upgrade operation performed in an appliance, according to one embodiment of the present disclosure.

FIG. 3B is a block diagram 300B of an incremental upgrade operation performed in an appliance, according to one embodiment. After setting up an upgrade container (steps 1-3 of FIG. 3A), in step 4 as shown in FIG. 3B, if the incremental upgrade operation fails, upgrade manager 135 deletes upgrade container 180, container image 185, and checkpoint 205. In step 5, a new image upgrade is created from changes to container 170 (e.g., as a new container image because original container image 185 is deleted) and in step 6, a new checkpoint .tar file based on the new container image upgrade is created. In step 7, the new container image is deleted and in step 8, a new checkpoint .tar file is created. In step 9, upgrade manager 135 performs checkpoint restore (e.g., /rootfilesystem and /) from the new checkpoint .tar file and a new root file system takes effect in appliance 105.

In some embodiments, performing the incremental upgrade operation includes deleting container 170 if the incremental upgrade operation is unsuccessful, and saving a container file system executing in container 170 (e.g., container file system 175(1)) to a new checkpoint if the incremental upgrade is successful (e.g., to upgrade container 180 as container file system 175(2)). In step 9, appliance 105 is restored based on the new checkpoint (e.g., based on upgrade container 180 with container file system 175(2)).

Example Upgrade Container Setup for Migration Upgrades

Figure 4A:
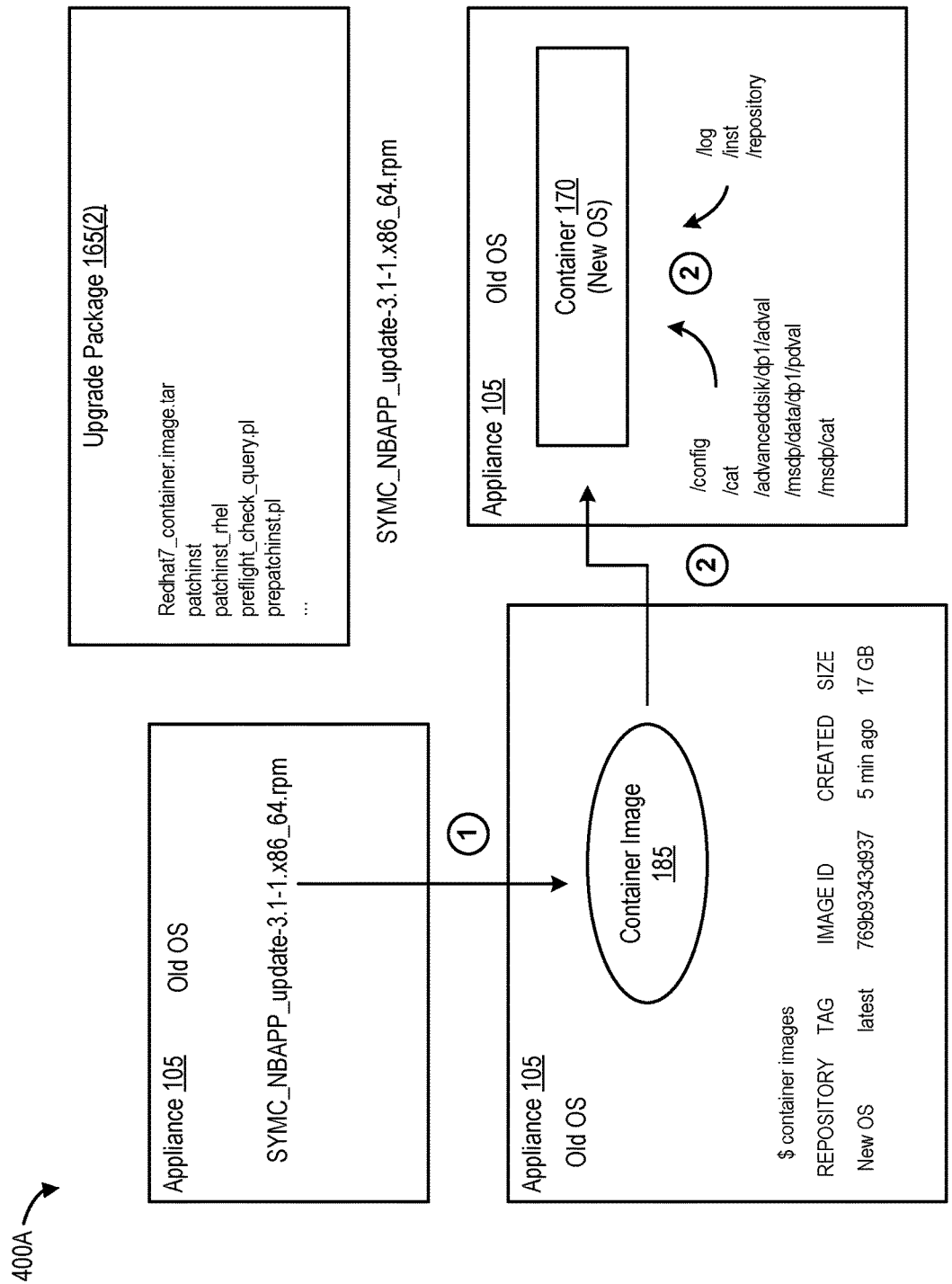
FIG. 4A is a block diagram 400A of upgrade container setup for a migration upgrade operation, according to one embodiment of the present disclosure.

FIG. 4A is a block diagram 400A of upgrade container setup for a migration upgrade operation, according to one embodiment. Performing an incremental upgrade operation in appliance 105 involves using upgrade package 165(2) provided by upgrade packages 165 as shown in FIG. 4A. Checkpoint engine 150 loads a .tar file that includes new OS upgrade files from upgrade packages 165 as container image 185. Upgrade container 180 is then generated based on container image 185. Upgrade manager 135 backs up user configuration information and re-configures the user configuration in upgrade container 180. If the migration upgrade operation (e.g., full OS replacement) fails, upgrade manager 135 deletes upgrade container 180, the temporary container upgrade image (e.g., container image 185), and the user configuration information. However, if the migration upgrade operation is successful (e.g., in container 170), upgrade manager 135 saves the running container file system (e.g., container file system 175(1)) to a new checkpoint .tar file (e.g., as container file system 175(2) in upgrade container 180). Appliance 105 can now be restored by upgrade manager 135 from the new checkpoint.

As shown in FIG. 4A, and in some embodiments, setting up an upgrade container involves at least three steps. In step 1, a .tar file with the new OS container image is loaded upgrade package 165(2) as container image 185. In step 2, container 170 is activated by running an instance of the new container image, mounting host directories to container 170, and starting an OS upgrade program in container 170. In this manner, container 170 includes the new version of OS 115 whereas appliance 105 is still based on the old (original) version of OS 115.

Figure 4B:
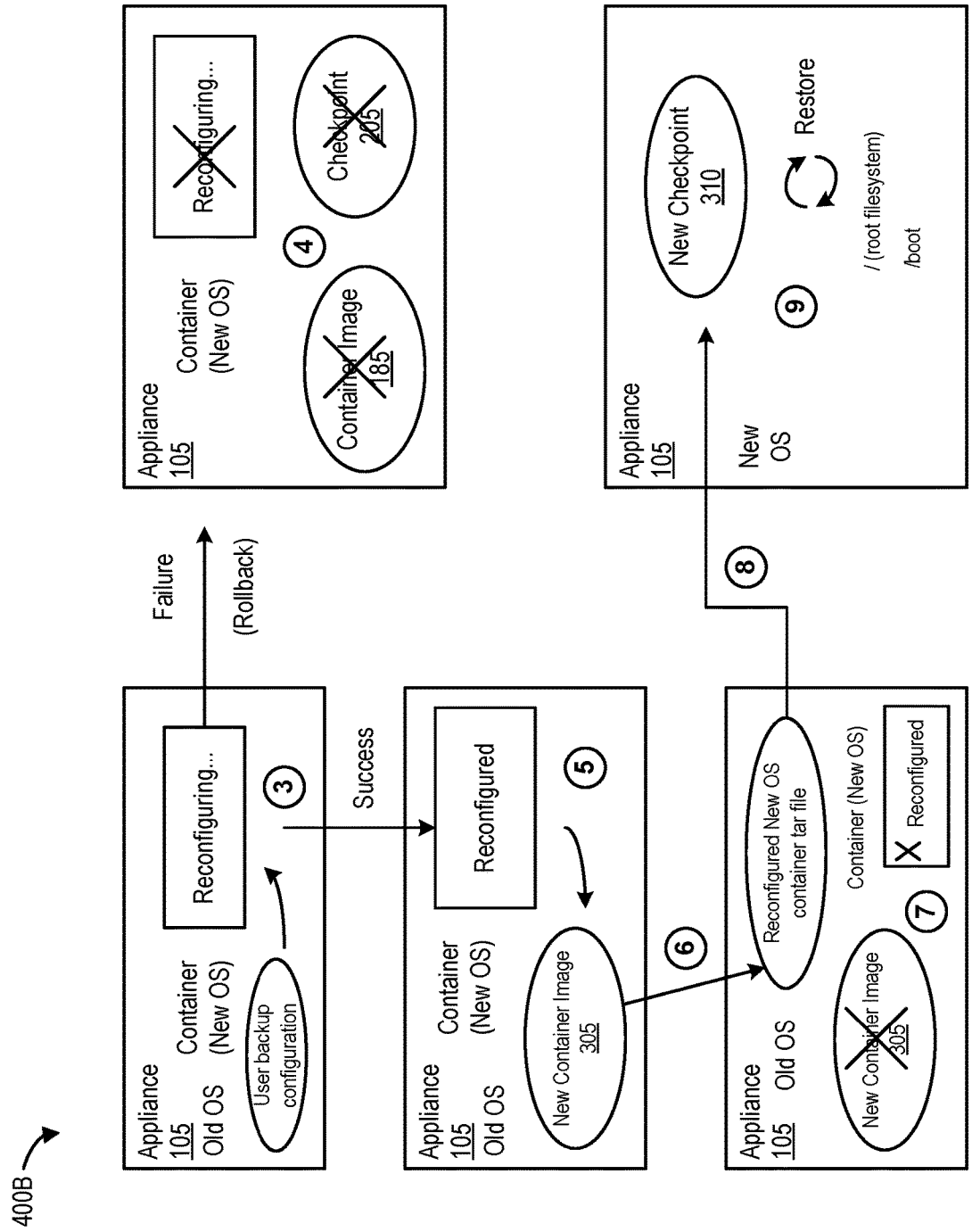
FIG. 4B is a block diagram 400B of a migration upgrade operation performed in an appliance, according to one embodiment of the present disclosure.

FIG. 4B is a block diagram 400B of a migration upgrade operation performed in an appliance, according to one embodiment. After container 170 is setup, upgrade manager 135 re-configures container 170 to generate upgrade container 180 (e.g., for restore). In step 3, upgrade manager 135 packs user configuration files and starts the re-configuration of container 170 (with the new OS/version). In step 4, if upgrade manager 135 fails to re-configure container 170 (and rollback is necessary), upgrade manager 135 simply deletes container 170, container images associated with container 170, and user backup configuration files without requiring or necessitating a reboot of appliance 105.

In step 5, if the re-configuration is successful, upgrade manager 135 creates a new upgrade container (e.g., a new container image 305) from changes to container 170, and at step 6 generate a new checkpoint .tar file based on the new container image 305. In step 7, upgrade manager 135 stops container 170 and deletes container 170 (as container 170 is no longer necessary), and in step 8, designates a new checkpoint .tar file as upgrade container 180 (from which to perform the migration upgrade operation). In step 9, appliance 105 is restored based on the new checkpoint (e.g., based on upgrade container 180 with container file system 175(2)).

In certain embodiments, upgrade manager 135 accesses an upgrade container image from an upgrade package as the container image (e.g., from upgrade package 165(2) as container image 185), creates an upgrade container (e.g., upgrade container 180) based on the upgrade container image, backs up user configuration information associated with appliance 205, and re-configuring the user configuration information in the upgrade container. In this example, the upgrade container and the upgrade container image are deleted if the migration upgrade operation is unsuccessful. If the migration upgrade operation is successful, a container file system stored in the upgrade container is saved to a new checkpoint, and the appliance is restored based on the new checkpoint. In should be noted that in some embodiments, container 170 may be upgraded "in place" such that container 170 starts as an existing file system (e.g., container file system 175(1) that is upgraded in container 170. For example, container file system 175(1) can be upgraded to container file system 175(2) in container 170 before upgrade manager 135 creates upgrade container 180 and transfers container file system 175(2) from container 170 to upgrade container 180.

Example Processes for Appliance Upgrades Using Container Sandboxes

Figure 5:
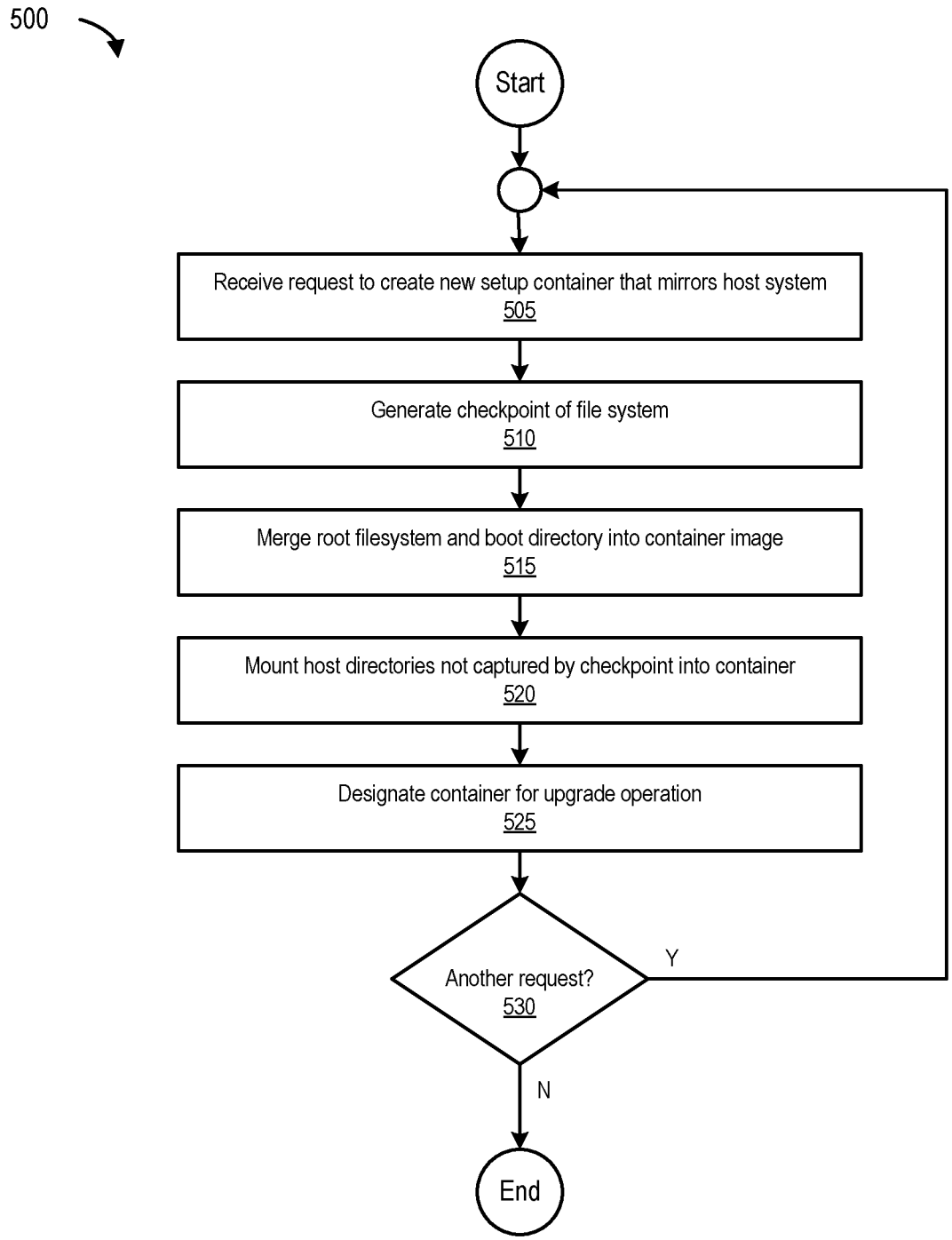
FIG. 5 is a flowchart 500 of a process for designating a container for an upgrade operation, according to one embodiment of the present disclosure.

FIG. 5 is a flowchart 500 of a process for designating a container for an upgrade operation, according to one embodiment. The process begins at 505 by receiving a request to create a new setup container that mirrors a host system (e.g., container 170 with container file system 175(1) that mirrors at least a portion of file system 110 of appliance 105. At 510, the process generates a checkpoint of one or more portions of the file system (e.g., one or more portions of OS 115 executing in file system 110 of appliance 105), and at 515, merges a root file system and a boot directory into a container image. It should be noted that a checkpoint like checkpoint 205 can capture only portions of OS 115 (e.g., root file system 120 and boot directory 125) that are required for successful OS upgrade operations. In some embodiments, merging separate .tar files into a single checkpoint for appliance container image mounting only applies to root file systems and boot directories that support such constructs. In other examples, various OSs may use different file and directory structures that don't involve merging.

At 520, the process mounts host directories not captured by the checkpoint into the container (e.g., container 170). It should be noted that in certain embodiments, upgrade container 180 is generated based on a new checkpoint that does not include host directories (which are not typically required for OS upgrade or installation). The host directories are only mounted into container 170 (e.g., the setup/testing container) to determine if a given OS upgrade operation is successful or unsuccessful). At 525, the process designates the container for the upgrade operation (e.g., by deleting the existing setup container and generating a new checkpoint in the form of an upgraded container). At 530, the process determines if there is another request. If there is another request, the process loops to 505. Otherwise, the process ends.

Figure 6:
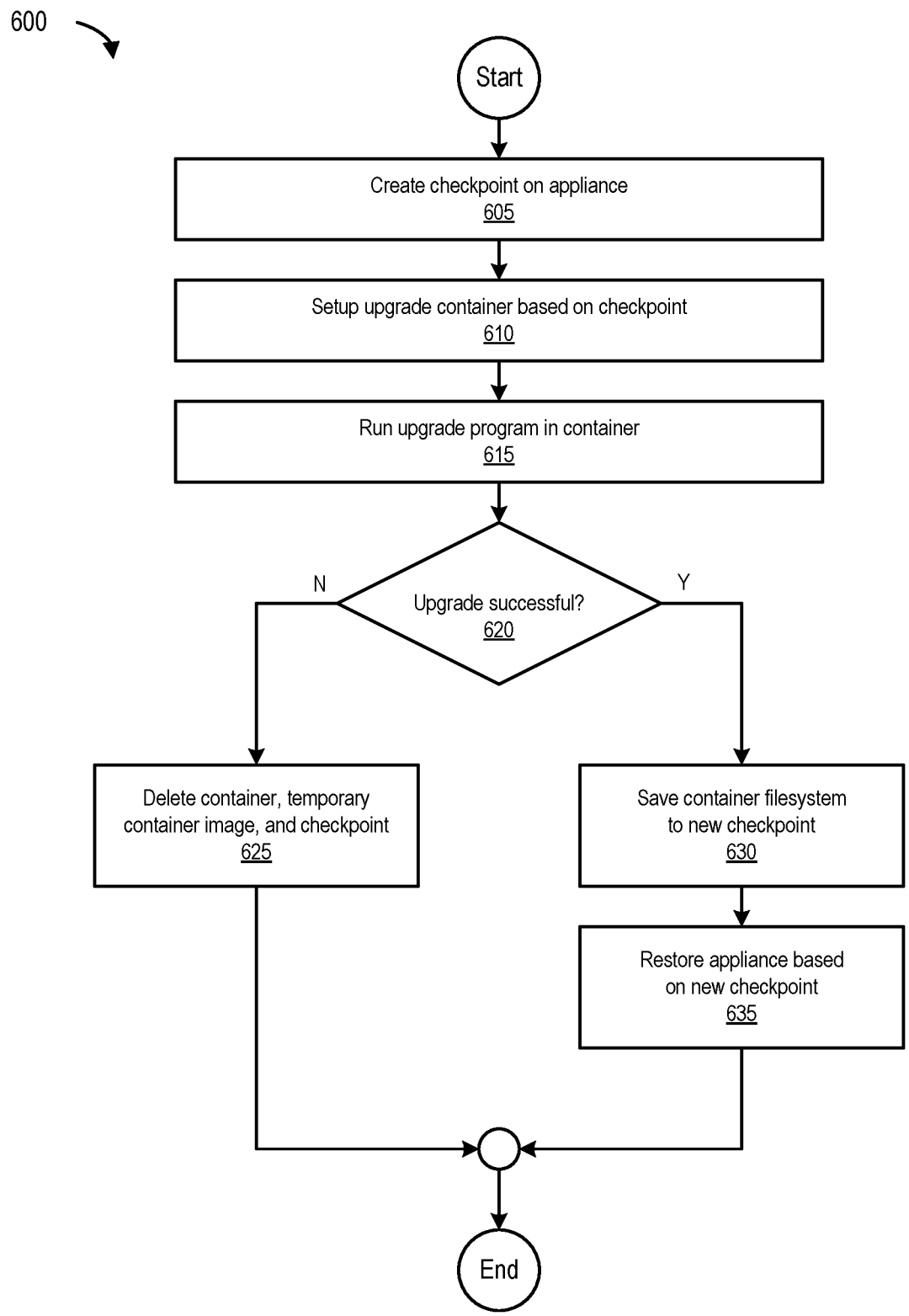
FIG. 6 is a flowchart 600 of a process for performing an incremental upgrade operation in an appliance, according to one embodiment of the present disclosure.

FIG. 6 is a flowchart 600 of a process for performing an incremental upgrade operation in an appliance, according to one embodiment. The process begins at 605 by creating a checkpoint on an appliance. At 610, the process sets up an upgrade container based on the checkpoint. At 615, the process runs an upgrade program in a container (e.g., a setup/testing container such as container 170). At 620, the process determines if the upgrade is successful.

If the upgrade is unsuccessful, the process ends at 625 by deleting the container, the temporary container image (e.g., container image 185), and the checkpoint. However, if the upgrade is successful, the process, at 630, saves the container filesystem (e.g., container file system 175(1) of container 170) to a new checkpoint (e.g., in the upgrade container as container file system 175(2)), and ends at 635 by restoring the appliance based on the new checkpoint (e.g., from upgrade container 180). In some embodiments, rather than restoring the appliance based on the new checkpoint, upgrade manager 135 simply runs appliance 105 from upgrade container 180 (e.g., a containerized OS where containers can be swapped with the OS).

Figure 7:
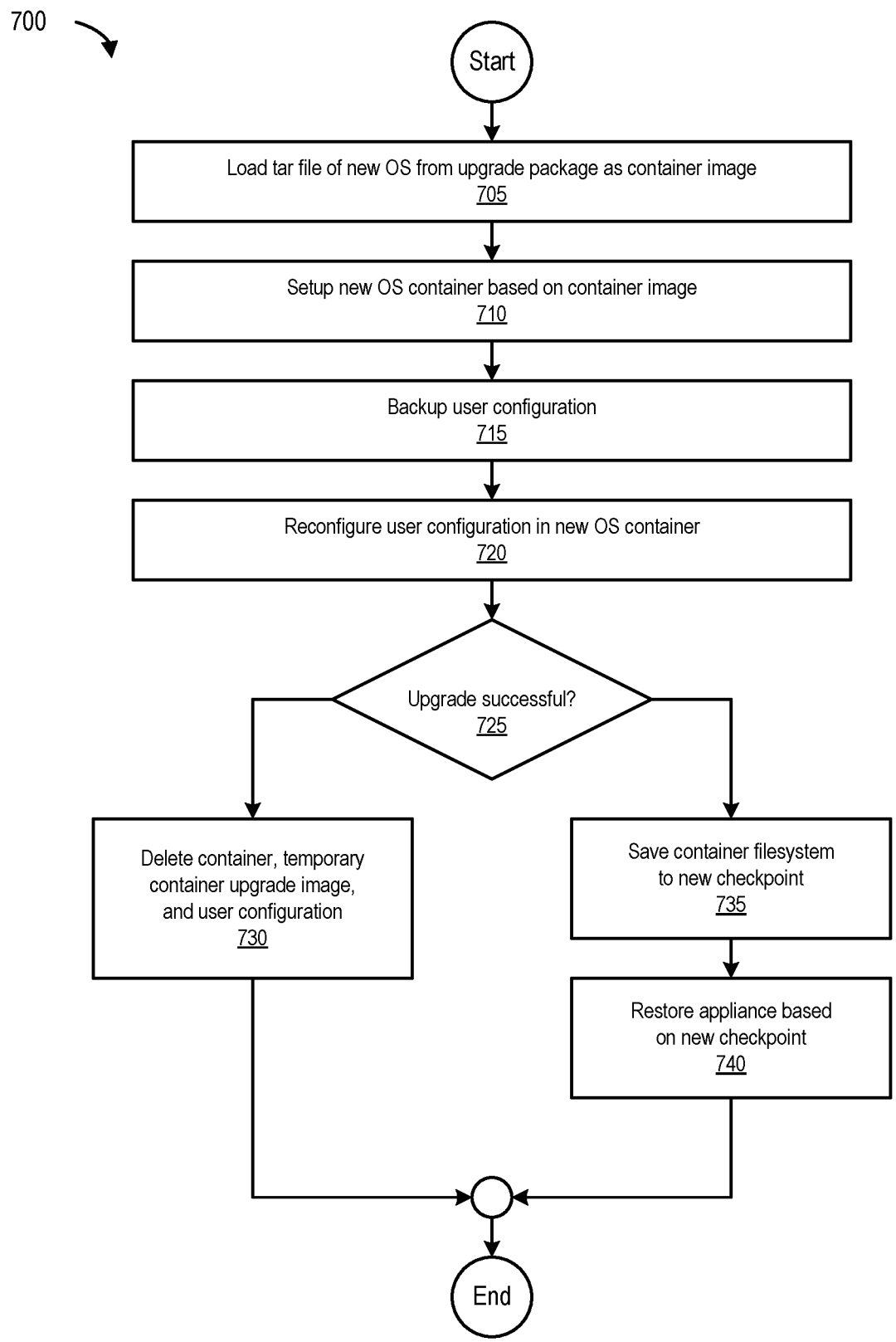
FIG. 7 is a flowchart 700 of a process for performing a migration upgrade operation in an appliance, according to one embodiment of the present disclosure.

FIG. 7 is a flowchart 700 of a process for performing a migration upgrade operation in an appliance, according to one embodiment. The process begins at 705 by loading a tar file of a new OS (or a new version of the existing OS) from an upgrade package as a container image. At 710, the process sets up a container based on the container image (e.g., container 170). At 715, the process backs up user configuration and at 720, reconfigures the user configuration in the new OS container. At 725, the process determines if the upgrade operation is successful.

If the upgrade operation is unsuccessful, the process ends at 730 by deleting the container, the temporary container upgrade image, and the user configuration. However, if the upgrade operation is successful, the process, at 735, saves the container filesystem to a new checkpoint (e.g., in an upgrade container), and ends at 740 by restoring the appliance based on the new checkpoint. In some embodiments, rather than restoring the appliance based on the new checkpoint, upgrade manager 135 simply runs appliance 105 from upgrade container 180 (e.g., a containerized OS where containers can be swapped with the OS).

Therefore, the methods, systems, and processes disclosed herein can be used to perform OS upgrades in appliances using container-based sandboxing by avoiding problems associated with sanity checks, rollback, and OS migration. The appliance host system's OS is upgraded in a secure virtual environment, without requiring requests for reboot in the case of rollback, and is upgraded efficiently for migration-based OS upgrades.

Example Computing Environment

Figure 8:
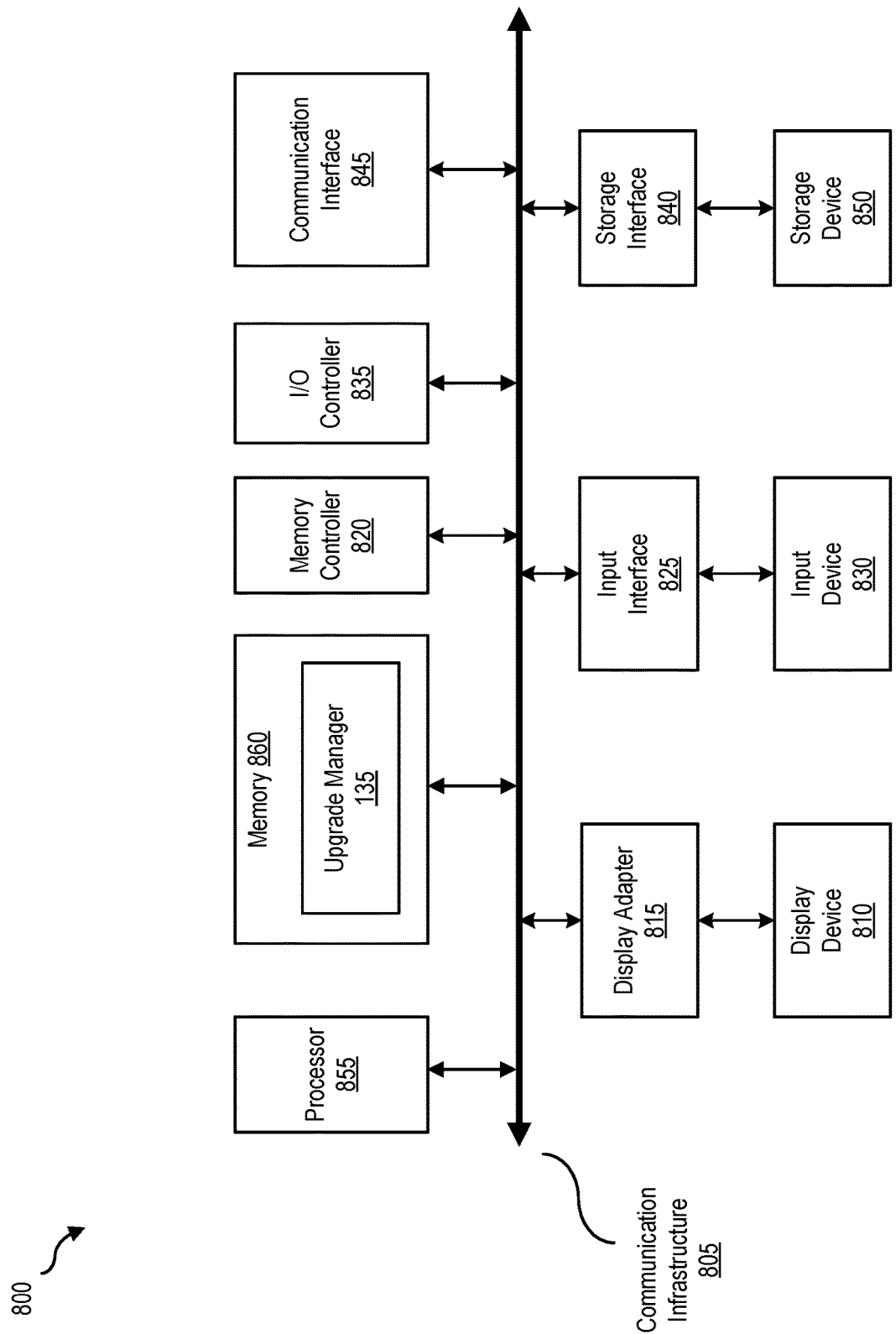
FIG. 8 is a block diagram of a computing system 800 that implements an upgrade manager, according to one embodiment of the present disclosure.

FIG. 8 is a block diagram of a computing system 800, according to one embodiment. Computing system 800 can include appliance 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes upgrade manager 135, computing system 800 becomes a special purpose computing device that is configured to perform container-based upgrades in appliances.

Processor 855 generally represents any type/form of processing unit capable of processing data or interpreting and executing instructions. In some embodiments, processor 855 may receive instructions from a software application or module that may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing upgrade manager 135 may be loaded into memory 860.

Computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments, memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a virtual machine and/or a physical computing device. I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices, and may facilitate communication between computing system 800 and a private or public network including additional computing systems. Examples of communication interface 845 include, without limitation, a wired network interface (e.g., network interface card), a wireless network interface (e.g., wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a telephone or cable network, a mobile connection, a satellite connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815 (e.g., in a GUI). Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in storage device 850. When executed by processor 855, a computer program loaded into computing system 800 may cause processor 855 to perform and/or be a means for performing the functions of one or more of the embodiments described herein. Alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
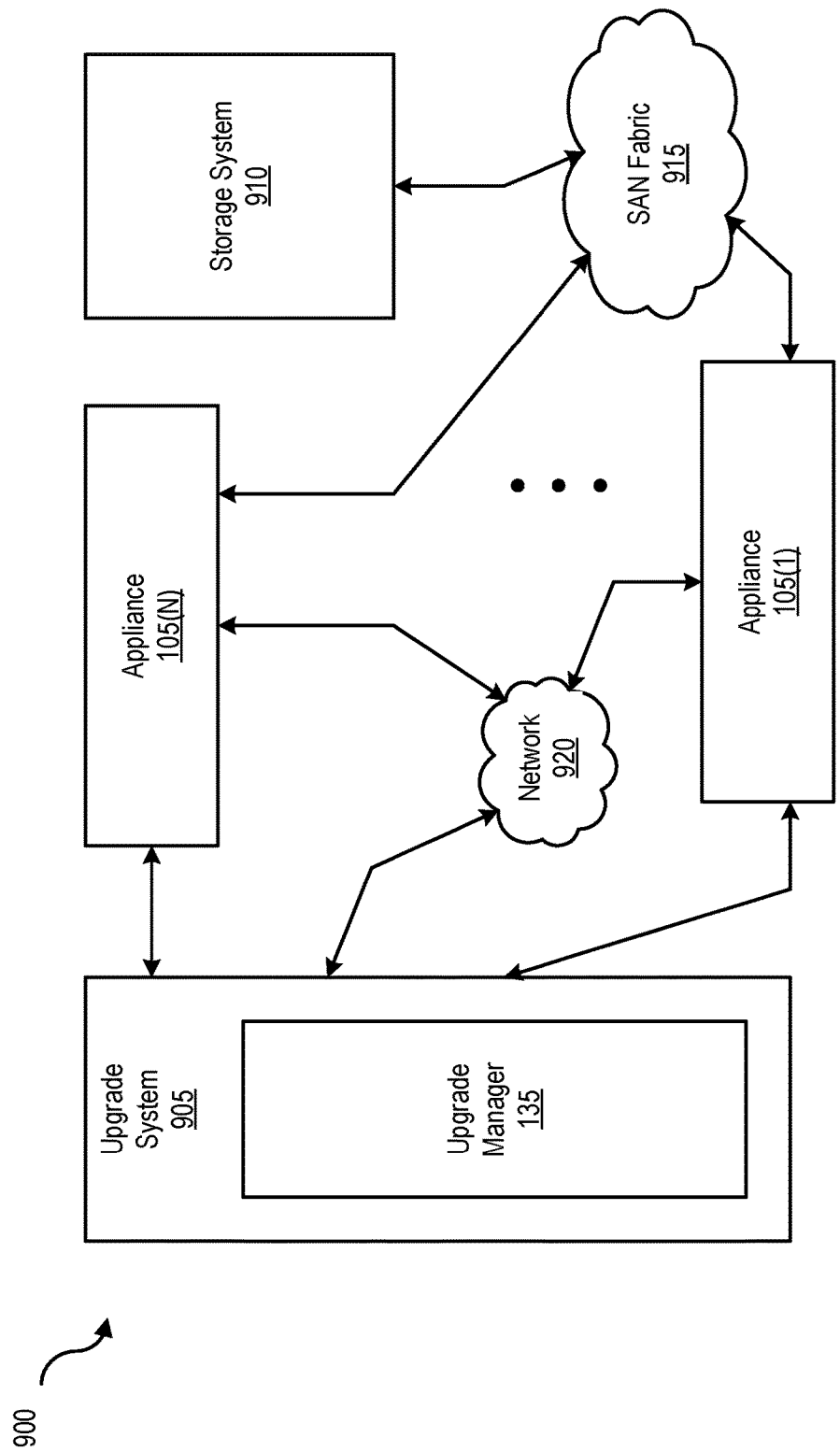
FIG. 9 is a block diagram of a networking system 900, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with appliances 105(1)-(N) using Network File System (NFS), Server Message Block (SMB), or Common Internet File System (CIFS). Network 920 generally represents any type or form of computer network or architecture capable of facilitating communication between appliances 105(1)-(N), and other computing devices.

In certain embodiments, a communication interface, such as communication interface 845 in FIG. 8, may be used to provide connectivity between appliances 105(1)-(N), and network 920. The embodiments described and/or illustrated herein are not limited to the Internet or any particular network-based environment. In some embodiments, network 920 can be a Storage Area Network (SAN). In other embodiments, upgrade manager 135 may be part of appliances 105(1)-(N), or may be separate. If separate, upgrade manager 135 may be implemented in upgrade system 905, which may be communicatively coupled to appliances 105(1)-(N) via a network (e.g., a LAN).

In one embodiment, all or a portion of one or more of the disclosed embodiments may be encoded as a computer program and loaded onto and executed by appliances 105(1)-(N). All or a portion of one or more of the embodiments disclosed herein may also be encoded as a computer program, stored on storage system 910, and distributed over network 920.

In some examples, all or a portion of appliances 105(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, upgrade manager 135 may transform the behavior of appliances 105(1)-(N) to perform container-based sandboxing upgrades in appliance-based computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
   generating a checkpoint of at least a portion of a file system of an appliance, wherein
      the portion of the file system is checkpointed to include an existing running environment of the appliance,
      the portion of the file system comprises at least a portion of an operating system of the appliance;
   producing a container image from the checkpoint, wherein
      the producing comprises
         generating an archive file from the checkpoint, wherein
            an internal structure of the archive file matches the portion of the file system in the existing running environment of the appliance, and
            the archive file is configured to be loaded as a file system of a container;

generating a container at the appliance using the container image, wherein
the container includes a file system based on the archive file, and
at least a portion of the file system of the container matches the portion of the file system of the appliance;
executing an upgrade package, wherein
the upgrade package is executable to perform an upgrade operation that upgrades the portion of the file system of the container that matches the portion of the file system of the appliance;
determining whether the upgrade operation was successful; and
in response to a determination that the upgrade operation was successful,
saving the upgraded portion of the file system of the container to a new checkpoint, and
restoring the appliance to a new running environment based, at least in part, on the new checkpoint.

2. The computer-implemented method of claim 1, wherein
the portion of the file system comprises at least a root file system and a boot directory.

3. The computer-implemented method of claim 2, further comprising:
merging the root file system and the boot directory into the container image; and
mounting one or more host directories not captured by the checkpoint into the container.

4. The computer-implemented method of claim 1, wherein
the upgrade operation comprises an incremental upgrade operation of the portion of the file system of the container.

5. The computer-implemented method of claim 4, further comprising:
determining that the upgrade operation comprises the incremental upgrade operation; and
performing the incremental upgrade operation, comprising
deleting the container if the incremental upgrade operation is unsuccessful, and
saving the upgraded portion of the file system of the container executing in the container to a new checkpoint if the incremental upgrade operation is successful.

6. The computer-implemented method of claim 5, further comprising:
determining that the upgrade operation comprises a migration upgrade operation;
accessing an upgrade container image from an upgrade package as the container image;
creating an upgrade container based on the upgrade container image;
backing up user configuration information associated with the appliance; and
re-configuring the user configuration information in the upgrade container.

7. The computer-implemented method of claim 6, further comprising:
performing the migration upgrade operation, comprising
deleting the upgrade container and the upgrade container image if the migration upgrade operation is unsuccessful, and
saving a container file system stored in the upgrade container to a new checkpoint if the migration upgrade operation is successful.

8. The computer-implemented method of claim 7, wherein
the upgrade container is a sandbox upgrade container,
the container file system is based on the container image,
the container file system is a copy of the file system associated with the appliance,
the checkpoint is configured to be loaded by a container daemon as a container root file system, and
performing the migration upgrade operation comprises replacing the operating system associated with the appliance.

9. A non-transitory computer readable storage medium comprising program instructions executable to perform a method comprising:
generating a checkpoint of at least a portion of a file system of an appliance, wherein
the portion of the file system is checkpointed to include an existing running environment of the appliance,
the portion of the file system comprises at least a portion of an operating system of the appliance;
producing a container image from the checkpoint, wherein
the producing comprises
generating an archive file from the checkpoint, wherein
an internal structure of the archive file matches the portion of the file system in the existing running environment of the appliance, and
the archive file is configured to be loaded as a file system of a container;
generating a container at the appliance using the container image, wherein
the container includes a file system based on the archive file, and
at least a portion of the file system of the container matches the portion of the file system of the appliance;
executing an upgrade package, wherein
an upgrade package is executable to perform an upgrade operation that upgrades a portion of the file system of the container that matches the portion of the file system of the appliance;
determining whether the upgrade operation was successful; and
in response to a determination that the upgrade operation was successful,
saving the upgraded portion of the file system of the container to a new checkpoint, and
restoring the appliance to a new running environment based, at least in part, on the new checkpoint.

10. The non-transitory computer readable storage medium of claim 9, wherein
the portion of the file system comprises at least a root file system and a boot directory.

11. The non-transitory computer readable storage medium of claim 10, wherein the method further comprises:
merging the root file system and the boot directory into the container image; and
mounting one or more host directories not captured by the checkpoint into the container.

12. The non-transitory computer readable storage medium of claim 10, wherein the method further comprises:
determining that the upgrade operation comprises an incremental upgrade operation; and performing the incremental upgrade operation, comprising
  deleting the container if the incremental upgrade operation is unsuccessful, and
  saving the upgraded portion of the file system of the container executing in the container to a new checkpoint if the incremental upgrade operation is successful.

13. The non-transitory computer readable storage medium of claim 12, wherein the method further comprises:
  determining that the upgrade operation comprises a migration upgrade operation;
  accessing an upgrade container image from an upgrade package as the container image;
  creating an upgrade container based on the upgrade container image;
  backing up user configuration information associated with the appliance; and
  re-configuring the user configuration information in the container.

14. The non-transitory computer readable storage medium of claim 13, wherein the method further comprises:
  performing the migration upgrade operation, comprising
    deleting the upgrade container and the upgrade container image if the migration upgrade operation is unsuccessful, and
    saving a container file system stored in the upgrade container to a new checkpoint if the migration upgrade operation is successful.

15. The non-transitory computer readable storage medium of claim 14, wherein
  the upgrade container is a sandbox upgrade container,
  the container file system is based on the container image,
  the container file system is a copy of the file system associated with the appliance,
  the checkpoint is configured to be loaded by a container daemon as a container root file system, and
  performing the migration upgrade operation comprises
    replacing the operating system associated with the appliance.

16. A system comprising:
  one or more processors; and
  a memory coupled to the one or more processors, wherein the memory stores program instructions executable by the one or more processors to perform a method comprising
    generating a checkpoint of at least a portion of a file system of an appliance, wherein
      the portion of the file system is checkpointed to include an existing running environment of the appliance,
      the portion of the file system comprises at least a portion of an operating system of the appliance,
    producing a container image from the checkpoint, wherein
      the producing comprises
        generating an archive file from the checkpoint, wherein
          an internal structure of the archive file matches the portion of the file system in the existing running environment of the appliance, and
          the archive file is configured to be loaded as a file system of the container;
    generating a container at the appliance using the container image, wherein
      the container includes a file system based on the archive file, and
      at least a portion of the file system of the container matches the portion of the file system of the appliance;
    executing an upgrade package, wherein
      the upgrade package is executable to perform an upgrade operation that upgrades the portion of the file system of the container that matches the portion of the file system of the appliance;
    determining whether the upgrade operation was successful; and
    in response to a determination that the upgrade operation was successful,
      saving the upgraded portion of the file system of the container to a new checkpoint, and
      restoring the appliance to a new running environment based, at least in part, on the new checkpoint.

17. The system of claim 16, wherein the portion of the file system comprises at least a root file system and a boot directory, the method further comprising:
  merging the root file system and the boot directory into the container image; and
  mounting one or more host directories not captured by the checkpoint into the container.

18. The system of claim 17, wherein the method further comprises:
  determining that the upgrade operation comprises an incremental upgrade operation; and
  performing the incremental upgrade operation, comprising
    deleting the container if the incremental upgrade operation is unsuccessful, and
    saving the upgraded portion of the file system of the container executing in the container to a new checkpoint if the incremental upgrade operation is successful.

19. The system of claim 17, wherein the method further comprises:
  determining that the upgrade operation comprises a migration upgrade operation;
  accessing an upgrade container image from an upgrade package as the container image;
  creating an upgrade container based on the upgrade container image;
  backing up user configuration information associated with the appliance;
  re-configuring the user configuration information in the upgrade container;
  deleting the upgrade container and the upgrade container image if the migration upgrade operation is unsuccessful; and
  saving a container file system stored in the upgrade container to a new checkpoint if the migration upgrade operation is successful.

20. The system of claim 19, wherein
  the upgrade container is a sandbox upgrade container,
  the container file system is based on the container image,
  the container file system is a copy of the file system associated with the appliance,
  the checkpoint is configured to be loaded by a container daemon as a container root file system, and
  performing the migration upgrade operation comprises
    replacing the operating system associated with the appliance.

* * * * *